United States Patent
Elledge (10) Patent No.: US 6,367,073 B2
(45) Date of Patent: *Apr. 2, 2002

(54) CENTRALIZED, AUTOMATED INSTALLATION OF SOFTWARE PRODUCTS

(75) Inventor: Dennis D. Elledge, Nampa, ID (US)

(73) Assignee: Micron Technology, Inc., Boise, ID (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/052,808

(22) Filed: Mar. 31, 1998

(51) Int. Cl.$^7$ .............................................. G06F 9/445
(52) U.S. Cl. ....................................... 717/11; 345/810
(58) Field of Search .................. 395/712; 709/201.203, 709/217, 220–222; 713/100; 345/348, 333, 352, 748, 749, 810; 717/11

(56) References Cited

U.S. PATENT DOCUMENTS

| | | | | |
|---|---|---|---|---|
| 5,666,501 A | * | 9/1997 | Jones et al. | 345/348 |
| 5,721,824 A | * | 2/1998 | Taylor | 709/203 |
| 5,794,052 A | * | 8/1998 | Harding | 395/712 |
| 5,835,777 A | * | 11/1998 | Staelin | 395/712 |
| 5,842,024 A | * | 11/1998 | Choye et al. | 395/712 |
| 5,860,012 A | * | 1/1999 | Luu | 717/11 |
| 5,881,236 A | * | 3/1999 | Dickey | 709/221 |
| 5,950,010 A | * | 9/1999 | Hesse et al. | 395/712 |
| 5,960,204 A | * | 9/1999 | Yinger et al. | 395/712 |

OTHER PUBLICATIONS

"Seagate Enterprise Management Software—East Announces Release of Desktop Management Suite; Best-of-Breed Point Solutions Integrated To Provide Heterogenous LAN Management", Business Wire, Apr. 2, 1996, pp. 04020056 (4–page).*

Great Lakes Business Solutions Introduces Wise Installation System TM WindowsTM Self–Installing Executables. Press Releases [online]. Wise Solutions, Inc., 1996 [retrieved on Oct. 4, 1999], 3 pages. Retrieved from the Internet: <URL: www.wisesolutions.com/pres.*

The Wise Installation System Enterprise EditionTM: A Complete Deployment Solution. Press Releases [online]. Wise Solutions, Inc., 1997 [retrieved on Oct. 4, 1999], 3 pages. Retrieved from the Internet:<URL:www.wisesolutions.com/press97.html>.*

Wise Solutions, Inc. Announces Wise Installation System 6.0. Press Releases [online]. Wise Solutions, Inc., 1st Quarter 1998 [retrieved on Oct. 4, 1999], 3 pages. Retrieved from the Internet:<URL:www.wisesolutions.com/press1q98.html>.*

Overview of Lett Products. Datasheet [online]. Lett Company, 1997 [retrieved on Oct. 1, 1999], 4 pages. Retrieved from the Internet:<URL:www.lett.de/EnglishAL/PrOver.html>.*

(List continued on next page.)

Primary Examiner—Tuan Q. Dam
(74) Attorney, Agent, or Firm—Dorsey & Whitney LLP (57) ABSTRACT

A preferred embodiment of the present invention provides a software facility for installing software products. The facility first displays a list of available software products that may be installed. The facility then receives user input selecting one of the available software products. After user input is received, the facility executes a script for installing the selected software product. In the preferred embodiment, the script is derived from an installation program provided by the vendor of the software product. The facility thus installs the selected software product without executing the installation program provided by the vendor of the software product. In a further preferred embodiment, the facility produces the executed script by executing the vendor installation program provided by the vendor of the software product, identifying changes made during the execution of the vendor installation program, and generating a script that, when executed, effects the identified changes.

25 Claims, 6 Drawing Sheets

OTHER PUBLICATIONS

Autoload—An Overview: A High–Performance Software Distribution System. Datasheet [online]. Lett Company, 1997 [retrieved on Oct. 1, 1999], 2 pages. Retrieved from the Internet:<URL:www.lett.de/EnglishAL/ALOver.html>.*

Autoload Description. Datsheet [online]. Lett Company, 1997 [retrieved on Oct. 1, 1999], 4 pages. Retrieved from the Internet:<URL:www.lett.de/EnglishAL/ALDesc.html>.*

Centralized Software Distribution Management System for UNIX Client–/Server Environment. Technical White Paper [online]. Lett Company, 1997 [retrieved on Oct. 01, 1999], 8 pages. Retrieved from the Internet:<URL:www.lett.de/EnglishAL/ALWhite.html>.*

Microsoft Corporation, *Introducing Microsoft Windows 95: For the Microsoft 95 Operating System,* Microsoft Corporation, 1995, Chap. 2, "Beyond the Basics," p. 35.

* cited by examiner

Fig. 1

Fig. 2 script ⟵ 300

11  Install File\\_mei01client1\infonet1\misc\Mfc40.dll to %SYS32%\Mfc40.dll (Preserve existing)
12  Install File\\_mei01client1\infonet1\misc\msvcirt.dll to %SYS32%\msvcirt.dll (Preserve existing)
13  Install File\\_mei01 client1\infonet1\misc\msvcrt.dll to %SYS32%\msvcrt.dll (Preserve existing)
14  Install File\\_mei01 client1\infonet1\misc\msvcrt40.dll to %SYS32%\msvcrt40.dll (Preserve existing)

21  Add "Set ClassPath*.;\\_mei01infonet1\iisapps\java\classes;\\_mei01infonet1\iisapps\java\classes\classes.zip" to AUTOEXEC.BAT 31  Registry Key NetscapeMarkup = Netscape Hypertext Document
32  Registry Key NetscapeMarkup\CLSID = {61D8DE20-CA9A-11CE-9EA5-0080C828E386}
33  Registry Key NetscapeMarkup\DefaultIcon = %MAINDIR%\NAVIGATOR\PROGRAM\NETSCAPE.EXE,1
34  Registry Key NetscapeMarkup\Insertable =
35  Registry Key NetscapeMarkup\protocol\StdFileEditing\server = %MAINDIR%\Navigator\PROGRAM\NETSCAPE.EXE
36  Registry Key NetscapeMarkup\protocol\StdFileEditing\verb\0 = &Edit
37  Registry Key NetscapeMarkup\shell\open\command = %MAINDIR%\NAVIGATOR\PROGRAM\NETSCAPE.EXE "%1"
38  Registry Key NetscapeMarkup\shell\print\command = %MAINDIR%\NAVIGATOR\PROGRAM\NETSCAPE.EXE /print("%1")
39  Registry Key NetscapeMarkup\shell\print\ddeexec = [print("%1")]

*Fig. 3* script 400

11  Install File\\_mei01\client1\infonet\$\misc\Mfc40.dll to %SYS32%\Mfc40.dll (Preserve existing)
12  Install File\\_mei01\client1\infonet\$\misc\msvcirt.dll to %SYS32%\msvcirt.dll (Preserve existing)
13  Install File\\_mei01 client1\infonet\$\misc\msvcrt.dll to %SYS32%\msvcrt.dll (Preserve existing)
14  Install File\\_mei01 client1\infonet\$\misc\msvcrt40.dll to %SYS32%\msvcrt40.dll (Preserve existing)

22  If System Has Windows 95 Running Start Block
21    Add "Set ClassPath*:;\\_mei01\infonet1\iisapps\java\classes;\\_mei01\infonet1\iisapps\java\classes\classes.zip" to AUTOEXEC.BAT
23  End Block 31  Registry Key NetscapeMarkup = Netscape Hypertext Document
32  Registry Key NetscapeMarkup\CLSID = {61D8DE20-CA9A-11CE-9EA5-0080C828E386}
33  Registry Key NetscapeMarkup\DefaultIcon = %MAINDIR%\NAVIGATOR\PROGRAM\NETSCAPE.EXE,1
34  Registry Key NetscapeMarkup\Insertable =
35  Registry Key NetscapeMarkup\protocol\StdFileEditing\server = %MAINDIR%\Navigator\PROGRAM\NETSCAPE.EXE
36  Registry Key NetscapeMarkup\protocol\StdFileEditing\verb\0 = &Edit
37  Registry Key NetscapeMarkup\shell\open\command = %MAINDIR%\NAVIGATOR\PROGRAM\NETSCAPE.EXE "%1"
38  Registry Key NetscapeMarkup\shell\print\command = %MAINDIR%\NAVIGATOR\PROGRAM\NETSCAPE.EXE /print("%1")
39  Registry Key NetscapeMarkup\shell\print\ddeexec = [print("%1")]

CENTRALIZED, AUTOMATED INSTALLATION OF SOFTWARE PRODUCTS

TECHNICAL FIELD

The invention relates generally to the field of software installation and turnkey systems.

BACKGROUND OF THE INVENTION

A software product is a program or group of programs that perform a related set of useful functions, such as operating systems; spreadsheet, word processing, database, and email applications; and disk compression, error correction, and defragmentation utilities. After purchasing a software product, a user must typically perform a process called "installation" to copy the software product onto his or her computer system and configure the software product for operation.

Installation processes may be fairly involved. In a typical installation process, the user must obtain and access a CD-ROM containing the software product. The user must then locate an installation program for the software product on the CD-ROM, and execute the installation program. The location of the installation program on the CD-ROM often varies from product to product, as does the method for executing the installation program once it is located. The installation program copies the software product onto the user's computer system and configures the software product for operation. The installation program generally uses a visual user interface, whose style also varies from product to product, to query the user for information that it uses to determine which portions of the software product to copy to the user's computer system and how to configure the software product for operation. The queried information is often highly technical in nature, and can be beyond the knowledge of a typical user. It is also often difficult for a user to relate questions posed by the installation program to the environment of his or her computer system.

In view of how difficult conventional software product installations can be to complete, an automated, centralized facility for installing software products would have significant utility.

SUMMARY OF THE INVENTION

In a preferred embodiment, the present invention provides a software facility for the centralized, automated installation of software products ("the facility"). The facility preferable creates an automated installation script ("script") for each software product, permit users to select a software product from a single list of software products such as a menu, and installs the selected software product with little or no user intervention using the script for the selected software product.

The facility preferably creates a script for a new software product by performing a trial installation of the software product using a vendor installation program provided with the software product. The facility monitors the changes made to the computer system during the trial installation process, and generates a script that automatically makes these same changes. After the facility generates a script for a software product, the script may be executed by users to automatically install the software product, and the vendor installation program for the software product is no longer needed.

Vendor installation programs commonly require a significant amount of user input. For example, various vendor installation programs require the version or portions of the software product to be installed, the location in which the software product is to be installed, the name and location of resources used by the computer system, and information about the purchaser of the software product used for warranty registration. In accordance with the invention, this user input is provided by a system administrator, whose body of knowledge about the information needed by vendor installation programs is more extensive than those of other users. Because the script is based on user input from a system administrator and the facility uses the script to install the software product for less knowledgeable users, each user installation is able to enjoy the benefits of the system administrator's more extensive knowledge.

DETAILED DESCRIPTION OF THE INVENTION

In a preferred embodiment, the present invention provides a software facility for the centralized, automated installation of software products ("the facility"). The facility preferable creates an automated installation script ("script") for each software product, permit users to select a software product from a single list of software products such as a menu, and installs the selected software product with little or no user intervention using the script for the selected software product.

The facility preferably creates a script for a new software product by performing a trial installation of the software product using a vendor installation program provided with the software product. The facility monitors the changes made to the computer system during the trial installation process, and generates a script that automatically makes these same changes. After the facility generates a script for a software product, the script may be executed by users to automatically install the software product, and the vendor installation program for the software product is no longer needed.

Vendor installation programs commonly require a significant amount of user input. For example, various vendor installation programs require the version or portions of the software product to be installed, the location in which the software product is to be installed, the name and location of resources used by the computer system, and information about the purchaser of the software product used for warranty registration. In accordance with the invention, this user input is provided by a system administrator, whose body of knowledge about the information needed by vendor installation programs is more extensive than those of other users.

Because the script is based on user input from a system administrator and the facility uses the script to install the software product for less knowledgeable users, each user installation is able to enjoy the benefits of the system administrator's more extensive knowledge.

Figure 1:
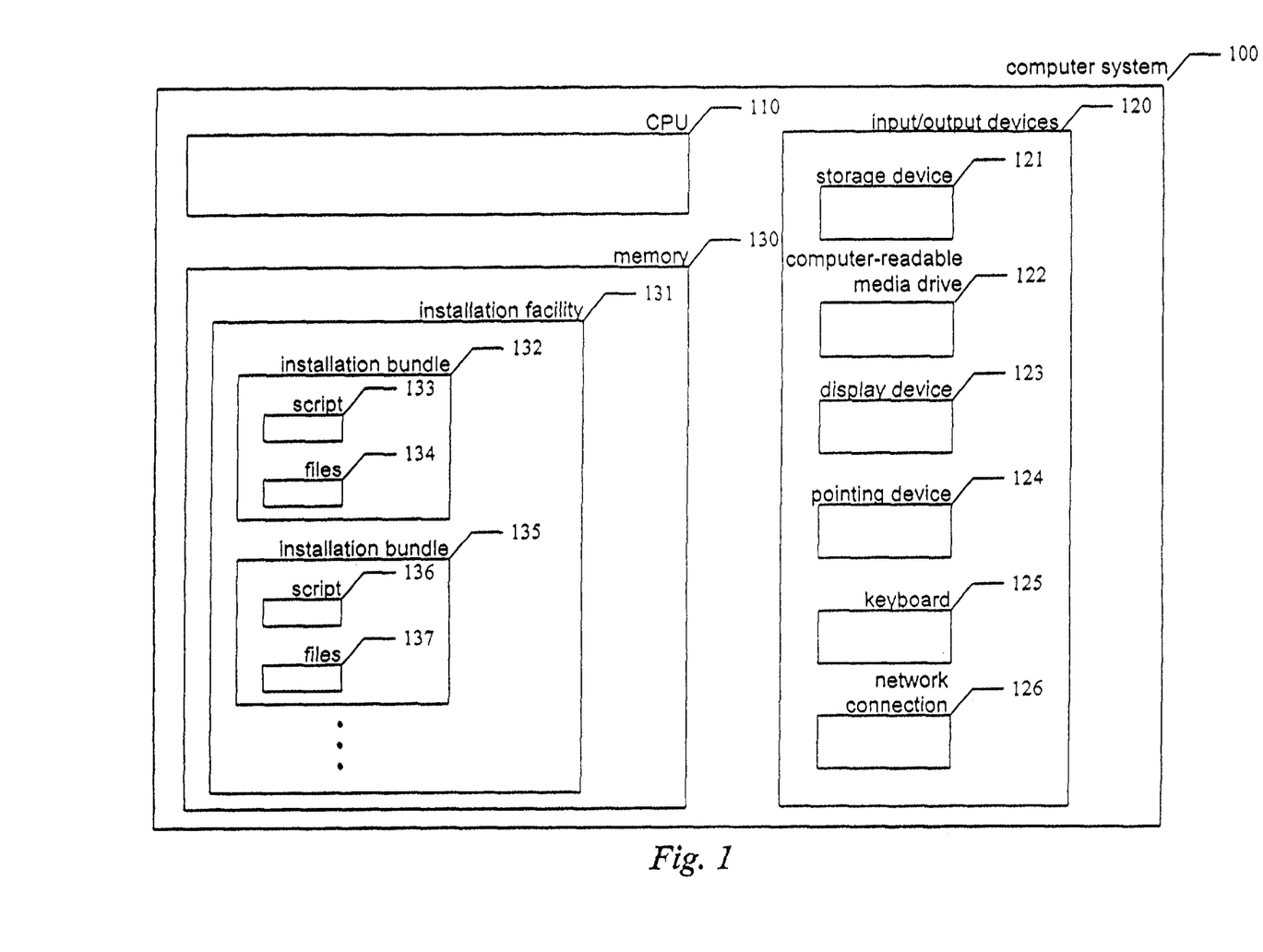
FIG. 1 is a high-level block diagram of the general-purpose computer system upon which the facility preferably executes.

FIG. 1 is a high-level block diagram of the general-purpose computer system upon which the facility preferably executes. The computer system 100 contains a central processing unit (CPU) 110, input/output devices 120, and a computer memory (memory) 130. Among the input/output devices are a storage device 121, such as a hard disk drive; a computer-readable media drive 122, which can be used to install software products, including the facility, which are provided on a computer-readable medium, such as a CD-ROM; a display device 123 for displaying visual information, such as a video monitor; a pointing device 124 that a user may use to select positions within displayed visual information, such as a mouse; a keyboard 125 or other text input device; and a network connection 126, through which the computer system 100 may communicate with other connected computer systems (not shown). The memory 130 preferably contains the installation facility 131 of the present invention. The data maintained by the installation facility 131 includes installation bundles such as installation bundles 132 and 135, each corresponding to a software product that may be installed by the facility. Each installation bundle contains a script for automatically installing this software product (e.g., script 133), and, optionally, one or more files associated with the software product (e.g., files 134) that may be copied to a user computer system in accordance with the script as part of the automated installation specified by the script. While the facility is preferably implemented on a computer system configured as described above, those skilled in the art will recognize that it may also be implemented on computer systems having different configurations.

Figure 2:
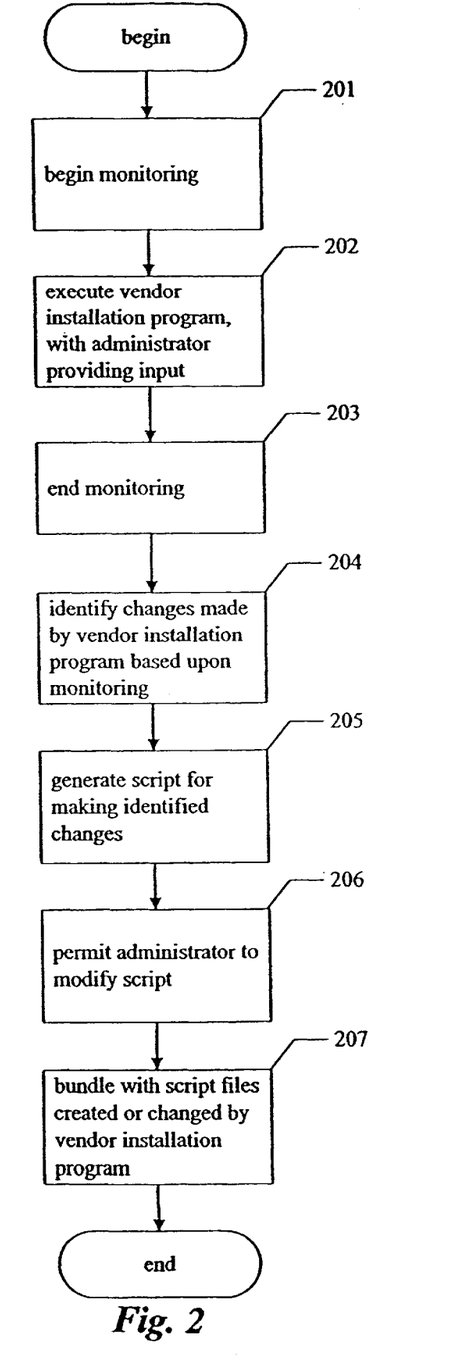
FIG. 2 is a flow diagram showing the steps preferably performed by the facility in order to enable the installation of a new software product.

FIG. 2 is a flow diagram showing the steps preferably performed by the facility in order to enable the installation of a new software product. The facility preferably performs these steps, for example, when a system administrator decides to make a new software product available for installation by users. At a high level, these steps involve monitoring the changes made by a vendor installation program supplied with the software product by the vendor of the software product, then generating a bundle containing a script and new or changed files that may be used later to automatically perform on a user computer system the same changes made by the vendor installation program. In a preferred embodiment, the facility performs this monitoring using a tool called the Wise Installation System, Enterprise Edition, available from Wise Solutions of Canton, Mich. These steps are performed on a prototypical computer system, on which a minimum of software products have preferably been installed. In particular, the new software product should not have been previously installed on the prototypical computer system.

In step 201, the facility begins monitoring for changes made by the vendor installation program. In a preferred embodiment, the facility begins monitoring by invoking a Repackage or Setup Capture feature of the Wise Installation System. In step 202, after monitoring has commenced, the facility executes a vendor installation program for the new software product. Executing a typical vendor installation program requires a user to provide user input in order for the vendor installation program to complete successfully. This input is preferably provided by a system administrator having detailed knowledge of the software product and the computer systems upon which the software product will be installed. In step 203, when execution of the vendor installation program completes, the facility ends its monitoring. In step 204, the facility identifies changes made by the vendor installation program to the prototypcial computer system using information collected during the monitoring period. For example, the facility may identify new files copied to a storage device on the prototypical computer system, preexisting files stored on a storage device of the prototypical computer system whose contents have been changed, or changes to computer system configuration data structures, such as changes to BIOS settings or changes to the Registry in prototype computer systems running the Microsoft Windows 95 or Microsoft Windows NT operating system. In step 205, the facility generates a script for making the identified changes. The script generated in step 205 is preferably executable on a user computer system in order to make the same changes identified in step 204, thereby installing the software product on the user computer system without executing the vendor installation program.

Figure 3:
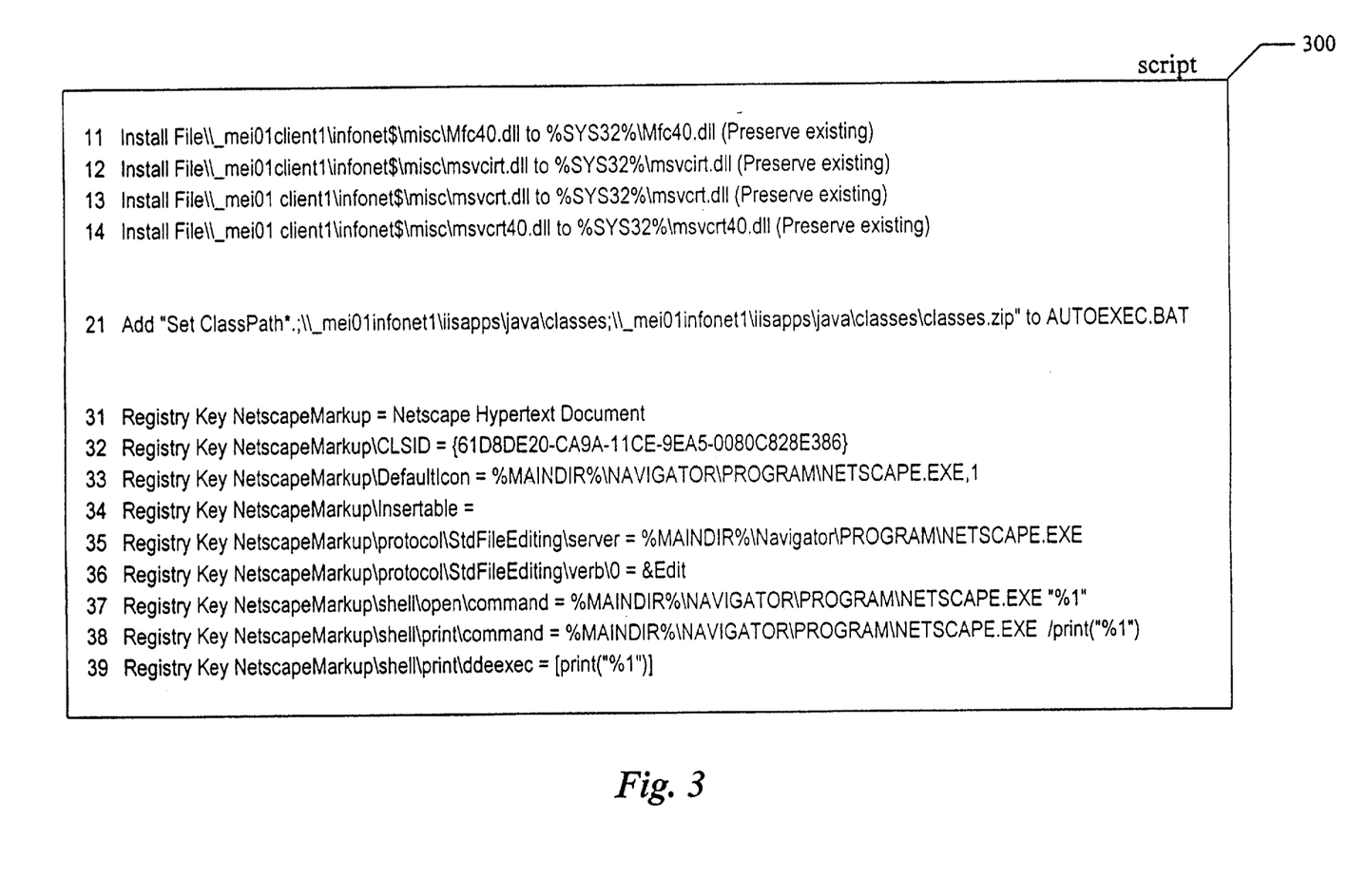
FIG. 3 is a diagram showing a sample script produced by the facility.

FIG. 3 is a diagram showing a sample script produced by the facility. The script 300 contains lines or "statements" 11–14, 21, and 31–39. Each statement specifies one change to be made to the configuration of the user computer system upon which the software product is installed by the script. Such changes can take many different forms. For example, statements 11–14 specify copying files to the user computer system, in this case files containing dynamic linked libraries to the target computer system. Statement 21 specifies adding a line to an existing file stored on the user computer system. Statements 31–39 specify adding keys to the Registry, a system configuration database of the user computer system. Those skilled in the art will recognize that statements specifying a variety of other types of changes to the user computer system may be included in the script by the facility.

Returning to FIG. 2, after the facility generates a script in step 205, the facility preferably permits a system administrator to modify the generated script in step 206. A system administrator may wish to modify this generated script for a variety of purposes. For example, the system administrator may wish to delete unnecessary statements, or to add new statements. If new statements are added, they may either be directed to performing additional changes, or to collecting further information upon which the operation of existing statements may be based. For example, a system administrator may add steps that collect information from the registry for use in other statements. Also, the system administrator may add steps that solicit information from the user in a user-friendly manner. This information may be used either to change the effect of executed statements, or to condition the execution of a particular statement.

Figure 4:
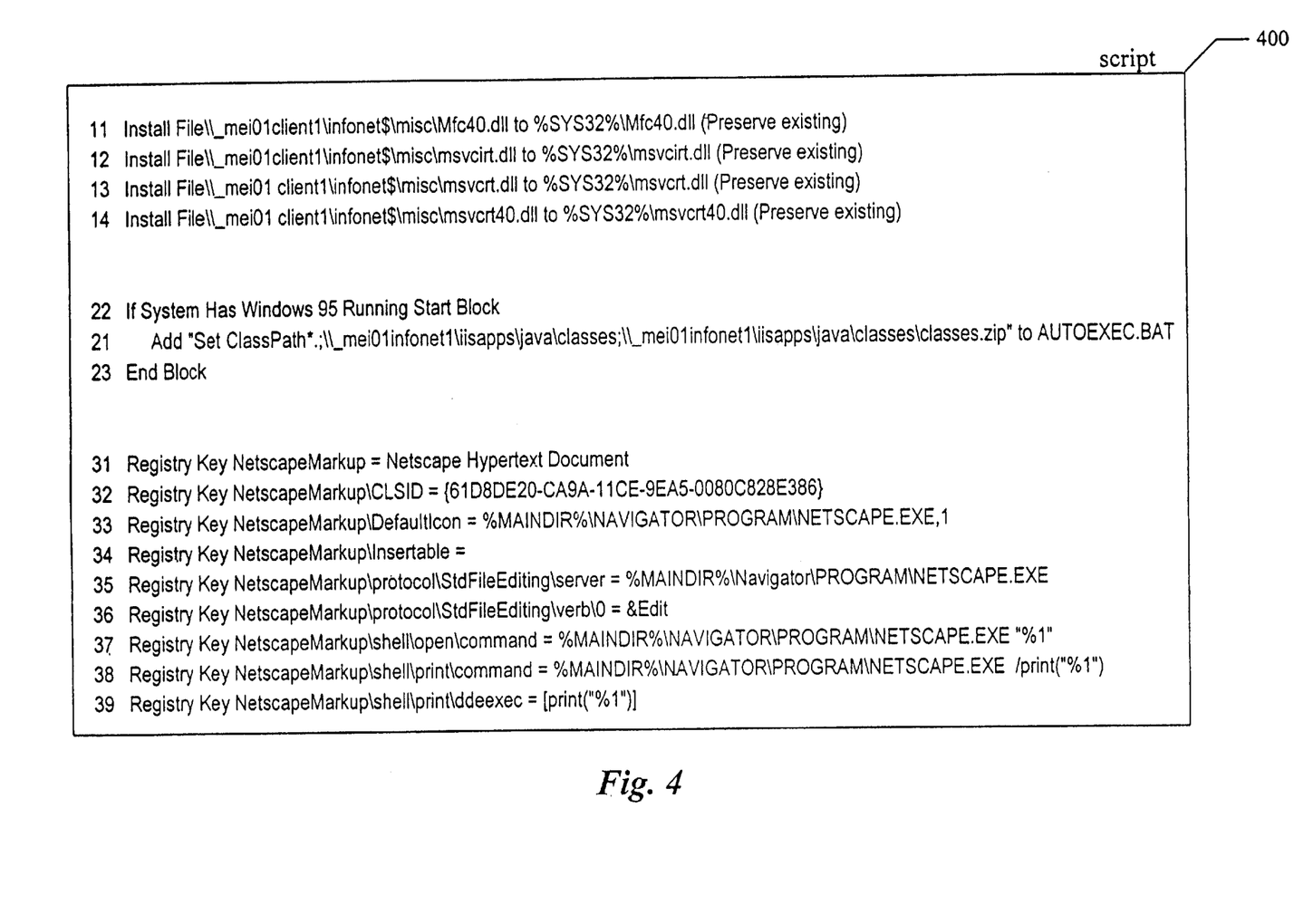
FIG. 4 is a diagram showing sample administrative modifications to a sample script.

FIG. 4 is a diagram showing sample administrative modifications to a sample script. The script 400 corresponds to the script 300 shown in FIG. 3, with the addition of user statements 22 and 23. New statements 22 and 23 have the effect of conditioning the execution of statement 21 on a determination of whether the user computer system is running the Microsoft Windows 95 operating system. If the user system does have Windows 95 running, then step 21 is executed. Otherwise, step 21 is not executed. As discussed above, in accordance with step 206, the system administrator may make a variety of modifications to the script for different reasons. On the other hand, in step 206, the system administrator may completely omit to modify the script.

In step 207, the facility bundles the script together with any files that were created or changed by the vendor installation program. In terms of the example, the facility preferably bundles with the script 400 the files referenced in statements 11–14. As a result of step 207, the script and the created or changed files together constitute a bundle that may be used to install the new software product on any user system. After step 207, the steps shown in FIG. 2 conclude.

Figure 5:
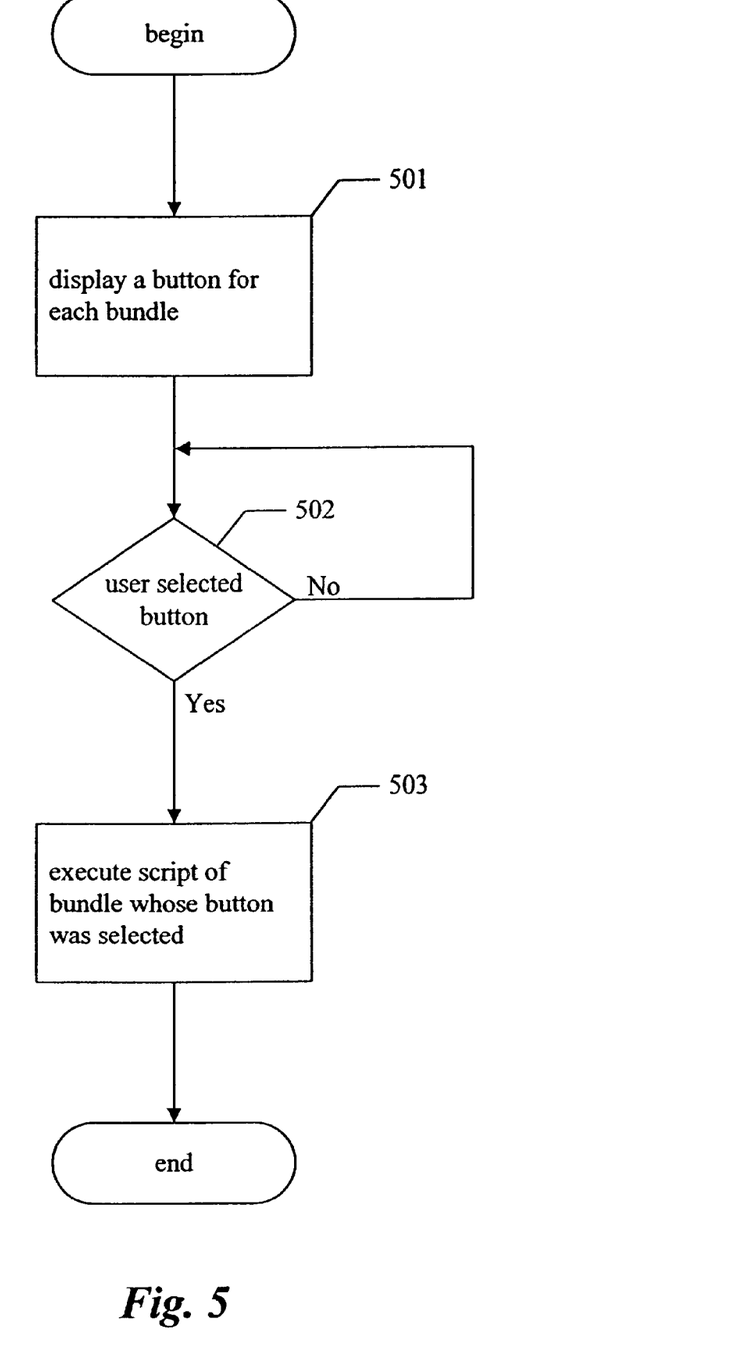
FIG. 5 is a flow diagram showing the steps preferably performed by the facility to install a software product on a user computer system.

After the facility has enabled the installation of one or more software products in accordance with the steps shown in FIG. 2, users may use the facility to install any of the software products on a user computer system. FIG. 5 is a flow diagram showing the steps preferably performed by the facility to install a software product on a user computer system. These steps are typically performed in a user computer system onto which the software product is to be installed. Alternatively, these steps may be performed in a first computer system in order to install a software product on a second computer system.

In step 501, the facility displays a software product performed in a user interface that preferably provides a button for each bundle. In step 502, if the user has selected one of the displayed buttons, then the facility continues in step 503, else the facility continues in step 502. In step 503, the facility executes the script of the bundle whose button was selected, executing its statements and, in the process, copying any created or changed files in the bundle to the user computer system. As a result of the facility's performance of step 503, the software product is installed on the user computer system. After step 503, these steps conclude.

Figure 6:
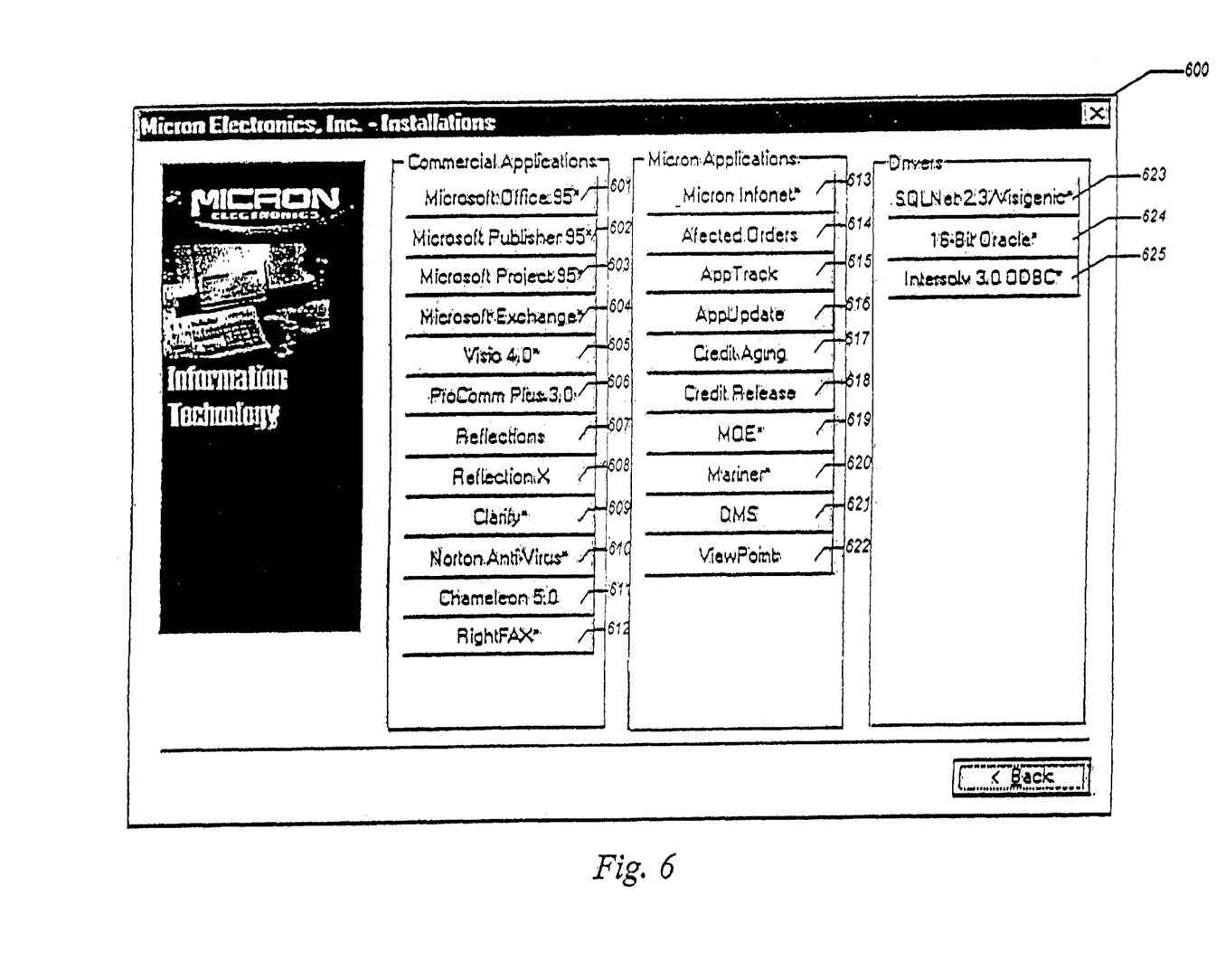
FIG. 6 is a display diagram showing a visual user interface of the facility used by users to install software products.

FIG. 6 is a display diagram showing a visual user interface of the facility used by users to install software products. The user interface window 600 contains a number of buttons 601–625, each corresponding to a software product whose installation by the facility has been enabled in accordance with the steps shown in FIG. 2. In order to install any of these software products in accordance with the steps shown in FIG. 5, the user need only use the pointing device or another input device to select the button corresponding to that software product. The facility, using the script for the selected software products, then installs the software product automatically, requiring little or no user input. Any user input that is required is prompted for in accordance with statements prepared by the system administrator, which prompt the user in a straightforward manner using terms familiar to the user.

While this invention has been shown and described with reference to preferred embodiments, it will be understood by those skilled in the art that various changes or modifications in form and detail may be made without departing from the scope of the invention.

I claim:

1. A method in a computer system for installing software products using an accessible script that is generated by the computer system and not provided by the vendor of the software products, the method comprising the steps of:
   displaying a list of available software products that may be installed, the list of available software products including software products from at least two vendors;
   receiving user input selecting one of the available software products;
   automatically determining whether a script for installing the selected software product other than an installation script provided by a vendor of the selected software product is accessible;
   if the script is accessible, automatically selecting, based on the selected software, the accessible script for installing the selected software product not provided by the vendor of the software product in order to install the selected software product;
   if the script is not accessible, automatically generating the script for installing the selected software product by a process including
      executing a vendor installation program provided by the vendor of the software product and, simultaneously with the execution of the vendor installation program, identifying changes made during the execution of the vendor installation program; and
      generating the script that, when executed, effects the identified changes; and
   automatically executing the selected script without any additional user input.

2. The method of claim 1 wherein the executing step copies files associated with the software product to a target computer system.

3. The method of claim 1 wherein the executing step modifies the contents of a preexisting file stored on a target computer system.

4. The method of claim 1 wherein the executing step modifies the contents of a system configuration data structure of a target computer system.

5. A computer-readable medium whose contents cause a computer system to install software products using an accessible script that is generated by the computer system and not provided by a vendor of the software products by performing the steps of:
   displaying a list of available software products that may be installed;
   receiving user input selecting one of the available software products;
   automatically determining whether a script for installing the selected software product other than an installation script provided by a vendor of the selected software product is accessible;
   if the script is accessible, automatically selecting, based on the selected software, the accessible script for installing the selected software product not provided by the vendor of the software product in order to install the selected software product;
   if the script is not accessible, automatically generating the script for installing the selected software product by a process including
      executing a vendor installation program provided by the vendor of the software product and, simultaneously with the execution of the vendor installation program, identifying changes made during the execution of the vendor installation program; and
      generating the script that, when executed, effects the identified changes; and
   automatically executing the selected script without any additional user input.

6. The method of claim 5 wherein the executing step copies files associated with the software product to a target computer system.

7. The method of claim 5 wherein the executing step modifies the contents of a preexisting file stored on a target computer system.

8. The method of claim 5 wherein the executing step modifies the contents of a system configuration data structure of a target computer system.

9. One or more computer memories collectively containing a software product installation data structure for use in installing a software product among a plurality of available software products acquired from one or more vendors using an accessible installation script that is generated by a computer system and not provided by the one or more vendors of the software products, the data structure comprising:

automatically determining whether the installation script for installing each available software product is accessible;

if the installation script is accessible, for each available software product, providing access to the accessible installation script not provided by the vendor for installing the software product, if the script is not accessible, automatically generating the script for installing the selected software product by a process including executing a vendor installation program provided by the vendor of the software product and, simultaneously with the execution of the vendor installation program, identifying changes made during the execution of the vendor installation program; and generating the script that, when executed, effects the identified changes, such that, when one of the available plurality of software products is selected for installation, the accessible installation script for the selected software product is, based on the selected software, automatically retrieved from the data structure and automatically executed in order to install the selected software product without any additional user input.

10. The computer memories of claim 9 wherein the data structure further comprises:

for each available software product, one or more files relating to the software product, the installation script for the software product specifying the copying of the files, such that, when an installation script for a selected software product is executed, the files relating to the selected software product may be copied from the data structure to a computer system upon which the selected software product is to be installed.

11. The computer memories of claim 10 wherein, for each available software product, at least one of the files contained in the data structure relating to the software product was not provided in the same form by a vendor.

12. A data processing system for installing software products among a plurality of software products using an accessible installation script that is generated by the data processing system and not provided by a vendor of the software products, comprising:

a display device for displaying a menu of the plurality of software products;

an input device for selecting one of the plurality of software products under user control; and a processor for automatically determining whether a script for installing the selected software product other than an installation script provided by a vendor of the selected software product is accessible, and if the script is accessible, automatically selecting, based on the selected software, if the script is not accessible, automatically generating the script for installing the selected software product by a process including executing a vendor installation program provided by the vendor of the software product and, simultaneously with the execution of the vendor installation program, identifying changes made during the execution of the vendor installation program; and generating the script that, when executed, effects the identified changes, and automatically executing the accessible installation script not provided with the selected software product for installing the selected software product without any additional user input.

13. The computer system of claim 12, further comprising:

a memory containing installation scripts each for installing one of the plurality of software products, the contained scripts being derived from vendor installation programs provided by vendors of the software products.

14. A method in a computer system for installing software products, comprising:

displaying a plurality of software products that may be installed on the computer system;

receiving user input selecting one of the software products;

automatically determining whether a non-vendor installation script for installing the selected software product other than an installation script provided by a vendor of the selected software product is accessible;

if a non-vendor installation script has previously been generated for the selected software product, automatically selecting the non-vendor installation script for installing the selected software product;

if a non-vendor installation script has not previously been generated, generating the non-vendor installation script for installing the selected software product on the computer system, wherein the generating of the non-vendor installation script includes executing a vendor installation script provided by the vendor of the software product;

simultaneously with the executing of the vendor installation script, monitoring changes made during the execution of the vendor installation script; and simultaneously with the executing of the vendor installation script, storing one or more commands that, when executed, duplicate the monitored changes; and automatically executing the non-vendor installation script for the selected software product without any additional user input.

15. The method of claim 14 wherein the displaying a plurality of software products comprises displaying a plurality of software products that are stored on a remote computer system that may be installed on the computer system.

16. The method of claim 14 wherein receiving user input selecting one of the software products comprises receiving user input via a visual interface not provided by the vendor of the software product.

17. The method of claim 14 wherein generating the non-vendor installation script for installing the selected software product comprises generating the non-vendor installation script on a remote computer system for installing the selected software product on the computer system.

18. A computer-readable medium whose contents cause a computer system to install software products by a method comprising:

displaying a plurality of software products that may be installed on the computer system;

receiving user input selecting one of the software products;

automatically determining whether a non-vendor installation script for installing the selected software product other than an installation script provided by a vendor of the selected software product is accessible;

if a non-vendor installation script has previously been generated for the selected software product, automatically selecting the non-vendor installation script for installing the selected software product;

if a non-vendor installation script has not previously been generated, generating the non-vendor installation script for installing the selected software product on the computer system, wherein the generating of the non-vendor installation script includes executing a vendor installation script provided by the vendor of the software product;

simultaneously with the executing of the vendor installation script, monitoring changes made during the execution of the vendor installation script; and simultaneously with the executing of the vendor installation script, storing one or more commands that, when executed, duplicate the monitored changes; and automatically executing the non-vendor installation script for the selected software product without any additional user input.

19. The method of claim 18 wherein the automatically executing the nonvendor installation script comprises copying files associated with the selected software product from a remote computer system to the computer system.

20. The method of claim 18 wherein the automatically executing the non-vendor installation script comprises modifying one or more files on the computer system.

21. A data processing system for installing software products, comprising:

a display device for displaying a menu of a plurality of software products;

an input device for selecting one of the plurality of software products; and a processor for installing the selected software product by a method comprising:

automatically determining whether a non-vendor installation script for installing the selected software product other than an installation script provided by a vendor of the selected software product is accessible;

if a non-vendor installation script has previously been generated for the selected software product, automatically selecting the non-vendor installation script for installing the selected software product;

if a non-vendor installation script has not previously been generated, generating the non-vendor installation script for installing the selected software product on the computer system, wherein the generating of the non-vendor installation script includes executing a vendor installation script provided by the vendor of the software product;

simultaneously with the executing of the vendor installation script, monitoring changes made during the execution of the vendor installation script; and simultaneously with the executing of the vendor installation script, storing one or more commands that, when executed, duplicate the monitored changes; and automatically executing the non-vendor installation script for the selected software product without any additional user input.

22. The system of claim 21 wherein the displaying a plurality of software products comprises displaying a plurality of software products that are stored on a remote computer system that may be installed on the computer system.

23. The system of claim 21 wherein receiving user input selecting one of the software products comprises receiving user input via a visual interface not provided by the vendor of the software product.

24. The system of claim 21 wherein generating the non-vendor installation script for installing the selected software product comprises generating the non-vendor installation script on a remote computer system for installing the selected software product on the computer system.

25. The system of claim 21 wherein the automatically executing the non-vendor installation script comprises copying files associated with the selected software product from a remote computer system to the computer system.

* * * * *